United States Patent
Curry

(10) Patent No.: US 8,817,630 B1
(45) Date of Patent: *Aug. 26, 2014

(54) PERIMETER-BASED PROTOCOL FOR EFFICIENTLY TRANSMITTING A MESSAGE THROUGH A COMMUNICATIONS NETWORK

(75) Inventor: William B. Curry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/330,483

(22) Filed: Dec. 19, 2011

Related U.S. Application Data

(63) Continuation of application No. 11/515,646, filed on Sep. 5, 2006, now Pat. No. 8,098,608.

(51) Int. Cl.
*G01R 31/08* (2006.01)

(52) U.S. Cl.
USPC .......... 370/237; 370/312; 370/230; 370/328; 370/395.5; 455/420; 455/443; 455/445; 455/453

(58) Field of Classification Search
CPC ..... H04W 16/16; H04W 16/18; H04W 28/26; H04W 36/023; H04W 40/026; H04W 40/08; H04W 40/10; H04W 40/24
USPC .............. 370/310.2, 312, 400, 319, 338, 339, 370/395.31, 395.32, 394, 474; 455/443, 455/445, 11.1
See application file for complete search history.

(56) References Cited

U.S. PATENT DOCUMENTS

| | | | |
|---|---|---|---|
| 4,451,699 | A | 5/1984 | Gruenberg |
| 5,023,930 | A | 6/1991 | Leslie |
| 5,038,403 | A | 8/1991 | Leitch |
| 5,172,396 | A | 12/1992 | Rose et al. |
| 5,193,162 | A | 3/1993 | Bordsen et al. |
| 5,423,059 | A | 6/1995 | LoGalbo et al. |
| 5,694,393 | A | 12/1997 | Kaye |
| 5,815,814 | A | 9/1998 | Dennison et al. |
| 5,924,042 | A | 7/1999 | Sakamoto et al. |

(Continued)

OTHER PUBLICATIONS

J. Arango et al., An Efficient Flooding Algorithm for Mobile Ad-Hoc Networks, Proc. of WiOpt 2004 (cs.arizona.edu), pp. 1-7.

(Continued)

*Primary Examiner* — Babar Sarwar
(74) *Attorney, Agent, or Firm* — Donna P. Suchy; Daniel M. Barbieri

(57) ABSTRACT

In a communications network having a plurality of nodes, a method of suppressing re-transmission of a message by a receiving node is disclosed. The receiving node receives a message from each of a plurality of transmitting nodes. Each of the receiving node and the transmitting nodes has a coverage area bounded by a perimeter. For each of the plurality of transmitting nodes, it is determined which portion of the perimeter of the coverage area of the receiving node is within the coverage area of the respective transmitting node. Re-transmission of the message by the receiving node is suppressed when the perimeter of the coverage area of the receiving node is completely within the combined coverage areas of the plurality of transmitting nodes.

29 Claims, 9 Drawing Sheets

(56) References Cited

U.S. PATENT DOCUMENTS

| | | | |
|---|---|---|---|
| 5,930,248 | A | 7/1999 | Langlet et al. |
| 5,963,868 | A | 10/1999 | Baek |
| 6,055,429 | A | 4/2000 | Lynch |
| 6,097,930 | A | 8/2000 | Hill et al. |
| 7,002,949 | B2 | 2/2006 | Garcia-Luna-Aceves et al. |
| 7,355,991 | B2 | 4/2008 | Huang et al. |
| 8,098,608 | B1 | 1/2012 | Curry |
| 2004/0100957 | A1* | 5/2004 | Huang et al. ............... 370/390 |
| 2004/0218557 | A1* | 11/2004 | Kim et al. ............... 370/312 |

OTHER PUBLICATIONS

J. Arango et al., An Efficient Flooding Algorithm for Mobile Ad-hoc Networks, Proceedings of the 2nd Workshop on Modeling and Optimizations in Mobile Ad Hoc and Wireless Networks, (WiOpt 2004), Cambridge, UK, Mar. 2004.

Luc Jaulin et al., Applied Interval Analysis, Springer-Verlag, London, UK, 2001, pp. 11-20.

* cited by examiner

PERIMETER-BASED PROTOCOL FOR EFFICIENTLY TRANSMITTING A MESSAGE THROUGH A COMMUNICATIONS NETWORK

CROSS-REFERENCE TO RELATED PATENT APPLICATIONS

This application is a Continuation of U.S. application Ser. No. 11/515,646 now U.S. Pat. No. 8,098,608 filed Sep. 5, 2006, incorporated herein by reference in its entirety.

FIELD OF THE INVENTION

The invention relates to communications, and more particularly, to the efficient broadcast of information through a wireless communications network.

BACKGROUND OF THE INVENTION

Communicating information in a communications network may be done in several ways. For example, a node in the network may transmit a message directly to an intended target node, or may transmit the message to one or more intermediate nodes with instructions to re-transmit the message until received by the target node. Another method of network communications is for a transmitting node to transmit a message so that all nodes in the network receive the message. Such a message would include information indicating that any receiving node re-transmit the message upon first receipt. However, unregulated retransmission of the message may result in nodes needlessly receiving the message multiple times, and some sort of algorithm or strategy is therefore needed to further reduce redundant message transmissions.

One strategy, known as Geoflood, uses location information to reduce the number of transmissions of a message where it is clear further transmissions of the message would only reach areas of the network already covered by previous transmissions of the message. Each message contains a location field that contains the geographic location of the node that has most recently transmitted the message. When a message is received by a node, the node computes how long it will hold the message before retransmitting it. FIG. 14 depicts a portion of a communications network 140 in which a receiving node R has a transmission radius 142. Transmission radius 142 defines a coverage area 144 of the receiving node. The coverage area is divided into four quadrants, namely the northeast quadrant NE, the northwest quadrant NW, the southeast quadrant SE, and the southwest quadrant SW. After receiving node R has established a holding time for the received message, the receiving node determines whether the same message has been received from neighboring nodes 146, 148, 150, 152 in each quadrant (NE, NW, SE, SW) of its coverage area before the holding time expires. According to the Geoflood algorithm, it is assumed that all or virtually all of coverage area 144 has received the message if the receiving node receives transmissions from neighboring nodes in each quadrant of the coverage area, and it is therefore not necessary for receiving node R to re-transmit the message.

The quadrant-based Geoflood algorithm just described was presumably chosen for its conceptual simplicity. However, accounting for the actual coverage area is a considerable bookkeeping challenge because each node must maintain four quadrant entries for each message during each holding time. Another disadvantage of the current Geoflood algorithm is shown in FIG. 15, in which the receiving node R receives transmissions from the four neighboring nodes 146, 148, 150, 152 in the respective quadrants NE, NW, SE, SW of coverage area 144 of the receiving node. According to the Geoflood algorithm, receiving node R does not re-transmit a received message, but there are portions 154, 156 of the coverage area that have not received the message from one of the neighboring nodes. Suppressing re-transmission of the message by receiving node R may result in nodes within portions 154, 156 not receiving the message. Thus, the Geoflood algorithm does not guarantee all of coverage area will receive a transmitted message.

Still another disadvantage of the Geoflood algorithm is that it requires redundant re-transmission of a message. At least four transmissions are required (one in each quadrant of a receiving node's coverage area) before re-transmission of the message is suppressed. As shown in FIG. 16 it is theoretically possible to fully account for all of a coverage area 144 of a receiving node R using the transmissions of three neighboring nodes 158, 160, 162 instead of four. However, because there is no transmission originating from a node in the southwest quadrant SW, the receiving node R will re-transmit a message when the coverage area 96 is already covered by the transmissions of the neighboring nodes 158, 160, 162. The quadrant-based Geoflood algorithm as currently instantiated is ill-suited to reduce these types of redundant transmissions.

It is therefore an object of the invention to provide a method of suppressing re-transmission of a message by a receiving node when neighboring nodes have already transmitted the message throughout the coverage area of the receiving node.

It is another object of the invention to provide a method of suppressing re-transmission of a message using an optimal number of transmissions from neighboring nodes.

It is still another object of the invention to provide a method of suppressing re-transmission of a message that ensures all parts of the coverage area of a receiving node can receive the message prior to suppression.

A feature of the invention is suppressing re-transmission of a message when the perimeter of the coverage area of a receiving node is completely overlapped, intersected, or covered by the coverage areas of other nodes that have transmitted the message to the receiving node.

An advantage of the invention is that before a node suppresses re-transmission of a message, all portions of the node's coverage area can receive the message from other nodes.

Another advantage is that the number of transmissions from neighboring nodes is optimized.

SUMMARY OF THE INVENTION

The invention provides, in a communications network having a plurality of nodes, a method of suppressing re-transmission of a message by a receiving node. The receiving node receives a message from each of a plurality of transmitting nodes. Each of the receiving node and the transmitting nodes has a coverage area bounded by a perimeter. For each of the plurality of transmitting nodes, it is determined which portion of the perimeter of the coverage area of the receiving node is within the coverage area of the respective transmitting node. Re-transmission of the message by the receiving node is suppressed when the perimeter of the coverage area of the receiving node is completely within the combined coverage areas of the plurality of transmitting nodes.

The invention also provides, in a communications network having a plurality of nodes, a method of suppressing re-transmission of a message by a receiving node. The receiving node receives a message from each of a plurality of transmitting nodes. Each of the receiving node and the transmitting nodes have a coverage area bounded by a perimeter. The coverage areas of the receiving node and each of the plurality of transmitting nodes are substantially similar in size. For each transmission of the message received by the receiving node from the plurality of transmitting nodes, an arc segment is defined along the perimeter of the coverage area of the receiving node. The arc segment being representative of the extent to which the perimeter of the coverage area of the respective transmitting node intersects the perimeter of the coverage area of the receiving node. Re-transmission of the message by the receiving node is suppressed when the perimeter of the coverage area of the receiving node is completely covered by the combined arc segments derived from the transmissions from the plurality of transmitting nodes.

The invention further provides a communications unit configured for use in an ad-hoc wireless network. A first transceiver is configured to receive a message from other transceivers in a coverage area. An outer limit of the coverage area is defined by a perimeter. A processor is configured to determine a relative position of the other transceivers from which the message has been received. The processor is further configured to suppress re-transmission of the message by the first transceiver when the perimeter of the coverage area associated with the first transceiver is completely within a combination of coverage areas of the other transceivers from which the message has been received.

DETAILED DESCRIPTION OF THE DRAWINGS

The invention changes the suppression criteria of the Geoflood algorithm. Instead of determining whether transmitting neighbor nodes are located in quadrants of the coverage area of a receiving node, the invention determines how much the perimeter of the coverage area of the receiving node is covered, intersected by, or overlapped by the coverage areas of the transmitting neighbor nodes. The receiving node suppresses re-transmission of the message when the perimeter of its coverage area is completely covered, intersected by, or overlapped by the coverage areas of the transmitting neighbor nodes.

Figure 1:
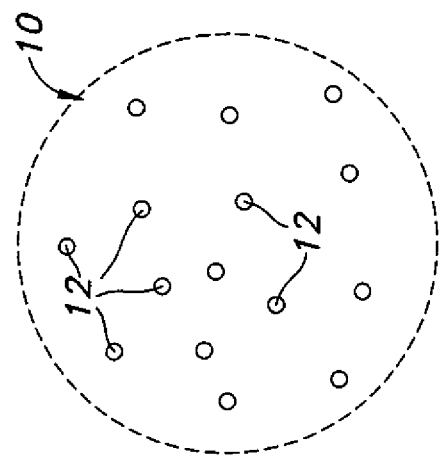
FIG. 1 is a schematic view of a network according to the invention.

FIG. 1 is a depiction of a communications network 10. Network 10 comprises a plurality of nodes 12 that are configured for communications with each other. Each node may be stationary or mobile, and may be associated with, for example, an aircraft, land-based vehicle, water-borne vehicle, or to an individual on foot. The nodes may have the capability to connect into and disconnect out of the network at will.

Figure 2:
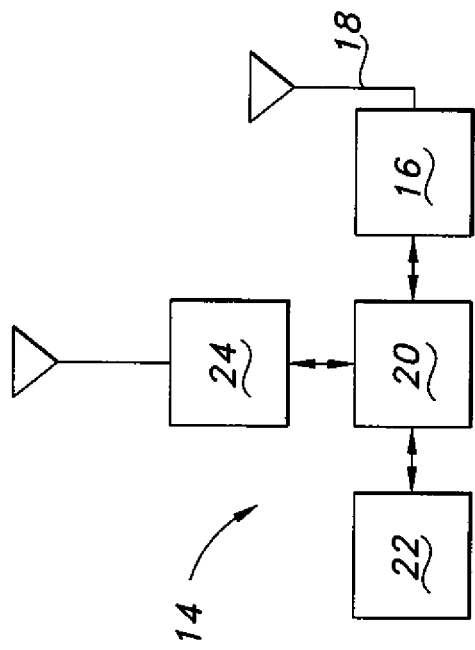
FIG. 2 is a simplified view of a communications device, or node, according to the invention.

FIG. 2 depicts a typical communications device 14 that may function as a node 12 in network 10. Communications device 14 includes a transceiver 16 that receives and transmits wireless signals through an antenna 18 according to known principles. A processor 20 is operationally connected to transceiver 16. Processor 20 is operative to, among other things, perform the computations necessary to determine whether a message should be re-transmitted by a receiving node. Processor 20 includes or is connected to a memory 22 that stores algorithms and data necessary for proper operation of the processor. Communications device 14 may receive location information from a receiver 24, which in a preferred embodiment is a global positioning system (GPS) receiver. Receiver 24 provides periodic updates of location information to processor. Receiver 24 is especially helpful when communications device 14 is designed to change location or to be mobile.

Figure 3:
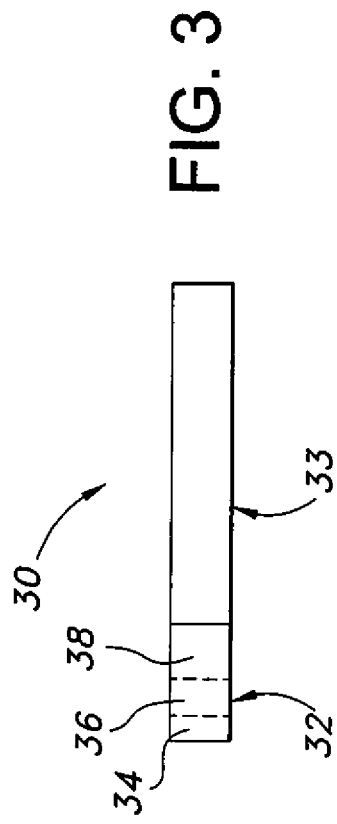
FIG. 3 is a simplified view of a message transmitted and received by communications devices, or nodes, according to the invention.

FIG. 3 is a simplified representation of a message 30 that is to be sent to all nodes in a communications network or to a predetermined geographical subdivision of the network. Message 30 includes a header 32 and a body portion 33. Header 32 includes a location portion 34 in which a transmitting node inserts its location. Header 32 may also include destination instructions 36 that instruct each node to transmit the message to a certain node or to some or all nodes in the network. Also included within the header is a message ID 38 unique to the information contained in body portion 33. The header may also include other network-related information according to known network protocols. Body portion 33 of the message includes the actual information or data to be transmitted across the network.

Figure 4:
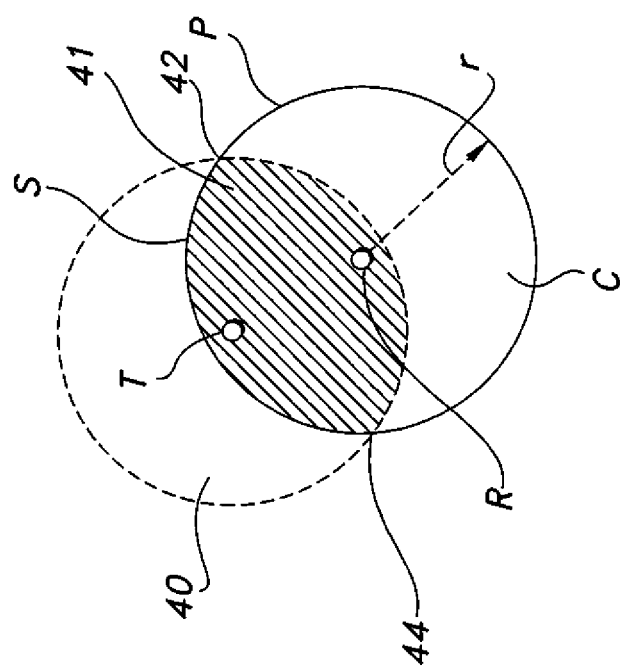
FIG. 4 is a simplified view of a receiving node and a transmitting node according to the invention.

The invention can be demonstrated by referring to FIG. 4, in which a receiving node R receives a message from a transmitting node T. Receiving node R has a coverage area C bounded by a perimeter P. A radius r represents a maximum transmission distance of the receiving node. It is assumed, for purposes of describing the invention, that transmitting node T has the same or a substantially similar maximum transmission distance as receiving node R. When transmitting node T transmits a message such that receiving node R receives the message, a portion of the coverage area 40 of transmitting node T overlaps a portion of coverage area C of receiving node R. Because nodes within this overlapped area 41 are within the coverage area 40 of transmitting node T, receiving node R does not need to re-transmit a message to the overlapped area. According to the invention, overlapped area 41 can be represented by an arc or line segment S, which is a portion of perimeter P defined by the points of intersection 42, 44 of the coverage areas of the two nodes. According to the invention, receiving node suppresses re-transmission of a message when perimeter P is completely overlapped, covered, or intersected by such line segments. When perimeter P is covered by existing transmissions and those transmissions are detected by receiving node R, every point in coverage area C will already have received the transmission. This follows because of the convexity of the coverage areas of the transmitting nodes. Therefore, instead of tracking areas or quadrants to determine if every node in coverage area C has already heard a transmission, it is sufficient to track the arc or line segments of perimeter P defined by overlapping coverage areas. If the transmissions have covered the entire 0 to $2\pi$ interval (equivalent to 0° to 360°) of the perimeter of receiving node R, the receiving node should not transmit the flooded message.

Figure 5:
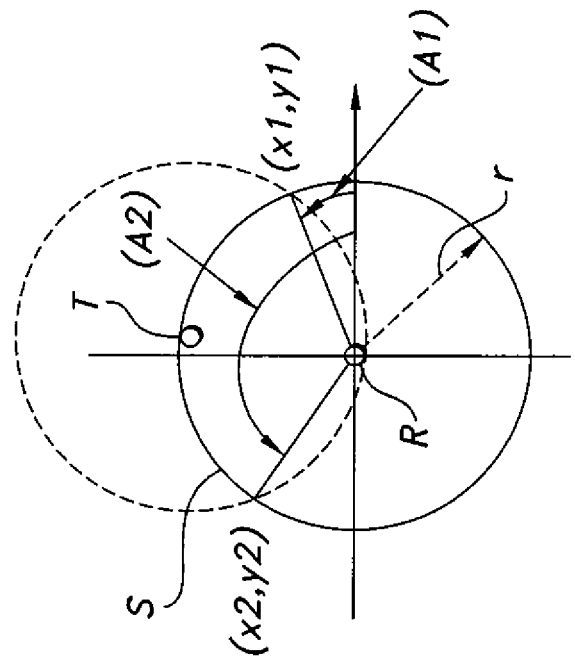
FIG. 5 is a simplified view of a receiving node and a transmitting node according to the invention.

To determine whether the entire perimeter P of receiving node R is covered by previous transmissions, the arcs or line segments defined by overlapping coverage areas must be computed. To illustrate the computations, FIG. 5 shows receiving node R and transmitting node T referenced using Cartesian coordinates for the sake of simplicity. The center of the coverage area of receiving node R is defined as (0, 0). Transmitting node T is centered at coordinates (a, b). The circle describing the transmitting node's coverage perimeter is:

$$(x-a)^2 + (y-b)^2 = r^2 \quad \text{(Equation 1)}$$

and the receiving node's coverage perimeter is:

$$(x)^2 + (y)^2 = r^2 \quad \text{(Equation 2)}$$

where r is the maximum coverage radius.

The circles intersect at the points (x1, y1) and (x2, y2), where $$x1 = \frac{1}{2} \cdot \frac{a \cdot b^2 + a^3 + \sqrt{b^2 \cdot (a^2 + b^2) \cdot (4 \cdot r^2 - a^2 - b^2)}}{(a^2 + b^2)} \quad \text{(Equation 3)}$$

$$y1 = \frac{-a}{b} \cdot x1 + \frac{a^2 + b^2}{2 \cdot b} \quad \text{(Equation 4)}$$

and $$x2 = \frac{1}{2} \cdot \frac{a \cdot b^2 + a^3 - \sqrt{b^2 \cdot (a^2 + b^2) \cdot (4 \cdot r^2 - a^2 - b^2)}}{(a^2 + b^2)} \quad \text{(Equation 5)}$$

$$y2 = \frac{-a}{b} \cdot x2 + \frac{a^2 + b^2}{2 \cdot b} \quad \text{(Equation 6)}$$

Knowing the coordinates (x1, y1) and (x2, y2), the angle A1, A2 of each intersection with respect to the X coordinate is found. As shown in FIG. 5, angles A1 and A2 may be used to express the endpoints (x1, y1), (x2, y2) of the line segment S overlapped by the coverage area of transmitting node T. For simplicity in calculations, denote the smaller angle as A1, and the larger angle as A2. If the difference between A1 and A2 is less than $\pi$ radians, the coverage interval of the transmission is [A1, A2]. However if the difference is greater than $\pi$, the transmitting node covers the two intervals: [0, A1] and [A2, $2\pi$].

To determine the perimeter coverage of messages received from multiple transmitting nodes, the union of each added interval set is determined. In the following examples the set of intervals E represents existing arc coverage from previous transmissions received by receiving node R, and interval F represents new arc coverage from the most recent transmission from a transmitting node.

Example 1
F=[6.1 to 6.1]
E={[0 to 1], [1.5 to 2], [5 to 6]}
F∪E={[0 to 1], [1.5 to 2], [5 to 6], [6.1 to 6.1]}

Example 2
F=[3 to 4]
E={[0 to 1], [1.5 to 2], [5 to 6]}
F∪E={[0 to 1], [1.5 to 2], [3 to 4], [5 to 6]}

Example 3
F=[2 to 5]
E={[0 to 1], [1.5 to 2], [5 to 6]}
F∪E={[0 to 1], [1.5 to 6]}

Figure 6:
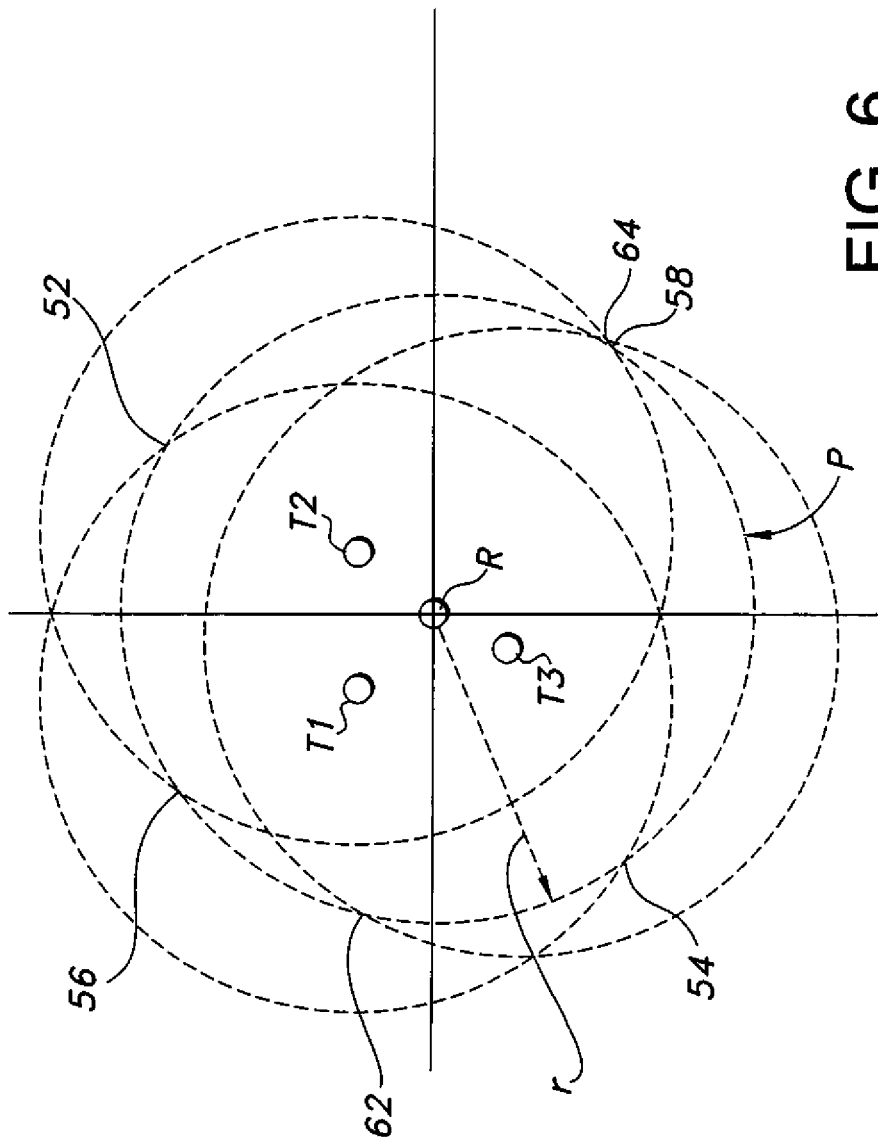
FIG. 6 is a simplified view of a portion of a network according to the invention.

The following example, with reference to FIG. 6, will demonstrate the operation of the invention, in which all described nodes, such as receiving node R, have a perimeter P defined by a maximum transmission distance r. For computational ease the location of the local node is defined as (0,0) on a Cartesian coordinate system, although other rectilinear coordinate systems or references may be used. Receiving node R receives a message from a first transmitting node T1. The message includes the location information for first transmitting node, which is located at (−1, 1). The receiving node computes how long to hold the message before potentially re-transmitting the message. Assigning a holding time to a received message preferably privileges distant nodes that would most quickly increase the coverage area of the transmitted message. In other words, nodes that would add the most coverage area re-transmit the message first, and those nodes most likely to have their coverage area covered by other nodes must wait the longest to re-transmit the message. An example of a known formula to determine the holding time is:

$$h(d) = m_{hold} - \frac{d \cdot m_{hold}}{r} \quad \text{(Equation 7)}$$

where:
h(d) is the computed holding time,
$m_{hold}$ is the maximum holding time,
d is the distance between the receiving node and the sending node, and
r is the maximum transmission radius.

A random offset may be added to avoid collision if the system does not allow for simultaneous reception of messages. Once the holding time is defined, receiving node R waits to see if it receives the same message from other nodes before the holding time expires. Of course, other formulas to compute the holding time may be used as well.

Receiving node also determines how much of perimeter P is covered by the transmission of the message from first transmitting node T1. The initial overall coverage angle or arc is E={ }. Using Equations 3 through 6, the intersection points 52, 54 of the coverage area perimeters of receiving node R and first transmitting node T1 are determined to be at (3, 4) and (−4, −3), which correspond to angles of 0.927 radians)(53.13° and 3.785 radians)(216.87° with respect to the receiving node. The difference between the two angles is 2.858 radians, which is less than 3.1415, so the new overall coverage angle is:
E={[0.927 to 3.785]}
={[53.13° to 216.87°]}

A second transmitting node T2, located at coordinates (1, 1) transmits the message to the receiving node. Using Equations 3 through 6, the intersection points 56, 58 of the coverage area perimeters of receiving node R and second transmission node T2 are determined to be at (−3, 4) and (4, −3), which correspond to angles for the second transmission of 2.214) (126.87° and 5.64) (323.13° with respect to receiving node R. The difference between these two angles is 3.425 radians) (192.26°, which is greater than 3.1415)(180°, so the arc coverage for the second transmission is {[0 to 2.214], [5.64 to 6.283]}. The overall coverage for the receiving node increases to:

E={[0 to 3.785], [5.64 to 6.283]}
={[0° to 216.87°], [323.13° to 360°]}

A third transmitting node T3, located at coordinates (−0.5, −1), transmits the message to the receiving node. Using Equations 3 through 6, the intersection points 60, 62 of the coverage area perimeters of receiving node R and third transmission node T3 are determined to be at (−4.694, 1.722) and (4.194, −2.722), which yields angles of 2.79)(159.8° and 5.708)(327°. The difference between these two angles is 2.918)(167.1°. Thus the coverage for the third transmission is [2.79 to 5.708]. The overall coverage angle increases to:

E={[0 to 6.283]}
={[0° to 360°]}

Because the entire perimeter P of receiving node R is covered or overlapped by transmissions from first, second and third transmitting nodes T1, T2, T3, the receiving node can conclude that its entire coverage area has already received the message, and the receiving node does not re-transmit the message. However, if the holding time expires before the receiving node determines its perimeter is completely overlapped by transmissions from other nodes, the receiving node transmits the message.

Figure 8:
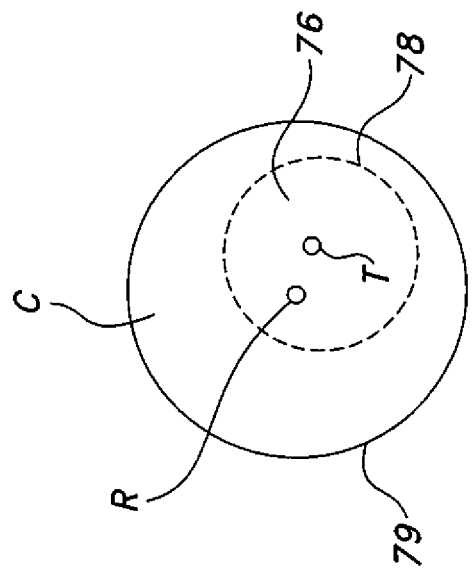
FIG. 8 is another simplified view of a portion of a network according to the invention.
Figure 7:
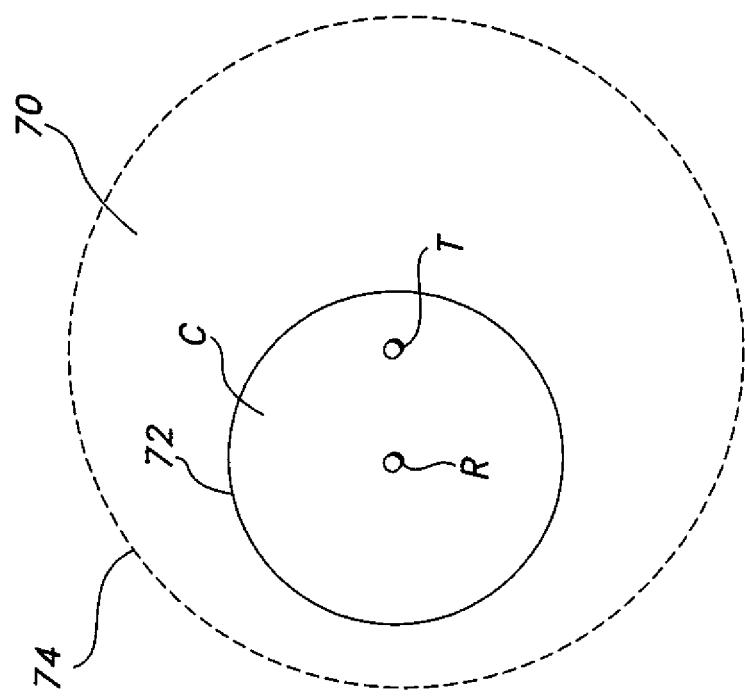
FIG. 7 is another simplified view of a portion of a network according to the invention.
Figure 9:
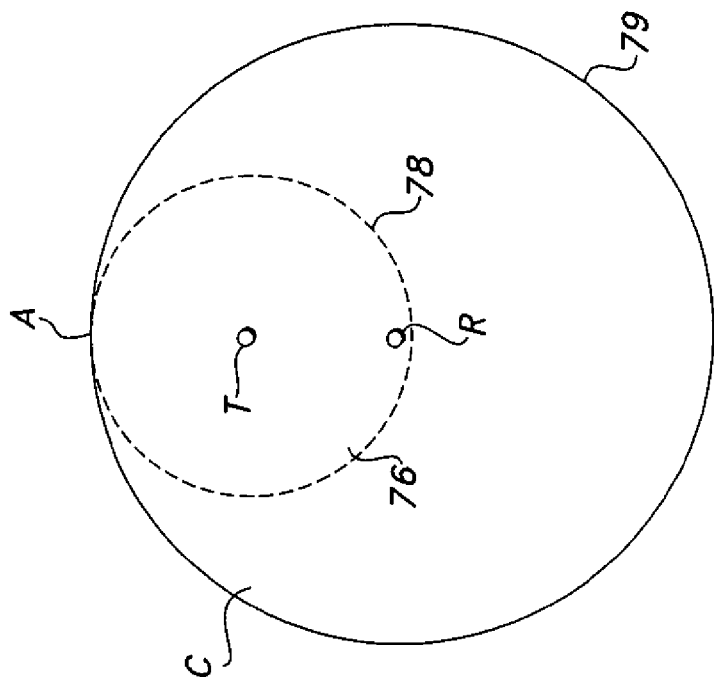
FIG. 9 is another simplified view of a portion of a network according to the invention.

The invention has been heretofore described as assuming the transmitting node has the same or similar maximum transmission distance as the receiving node. However, the invention also contemplates that the maximum transmitting distances of the transmitting and receiving node may differ from each other. Equations 1-6 can, without excessive or undue experimentation, be modified to accommodate dissimilar maximum transmitting distances such that the intersection of the coverage areas of the transmitting and receiving nodes may be determined. However, differently sized coverage areas may not intersect. FIG. 7 depicts a situation receiving node R having a coverage area C. A transmitting node T has a coverage area 70 that completely includes coverage area C therein. If the receiving node receives a message from the transmitting node but cannot determine any intersection of the perimeter 72 of coverage area C and the perimeter 74 of the coverage area 70 of transmitting node, and it is known or determined that the maximum transmission distance of the transmitting node is greater than the maximum transmission distance of the receiving node, it is therefore assumed that all of the coverage area of the receiving node is included in the coverage area of the transmitting node, and that there is therefore no need for the receiving node to further transmit the message. If on the other hand it is known or determined that the maximum transmission distance of the transmitting node is less than that of the receiving node when there is no intersection of the perimeters of the respective coverage areas, it is assumed that the coverage area of the transmitting node is entirely within the coverage area of the receiving node. This arrangement is shown in FIG. 8. Even though the coverage area 76 of transmitting node T does overlap part of the coverage area C of receiving node R, for the purposes of the invention transmitting node T is not considered to contribute to the invented solution because no part of the perimeter 78 of coverage area 76 intersects the perimeter 79 of coverage area C. FIG. 9 depicts a special case of the arrangement of FIG. 8 where the perimeter 78 of coverage area 76 intersects the perimeter 79 of coverage area C at a single point A. According to the invention, transmitting node T therefore contributes a single point to the coverage angle of the receiving node. Such a single point contribution may be ignored by the receiving node because its contribution to the overall coverage angle is negligible. Alternatively, the single point contribution may be added to the overall coverage angle.

Figure 10:
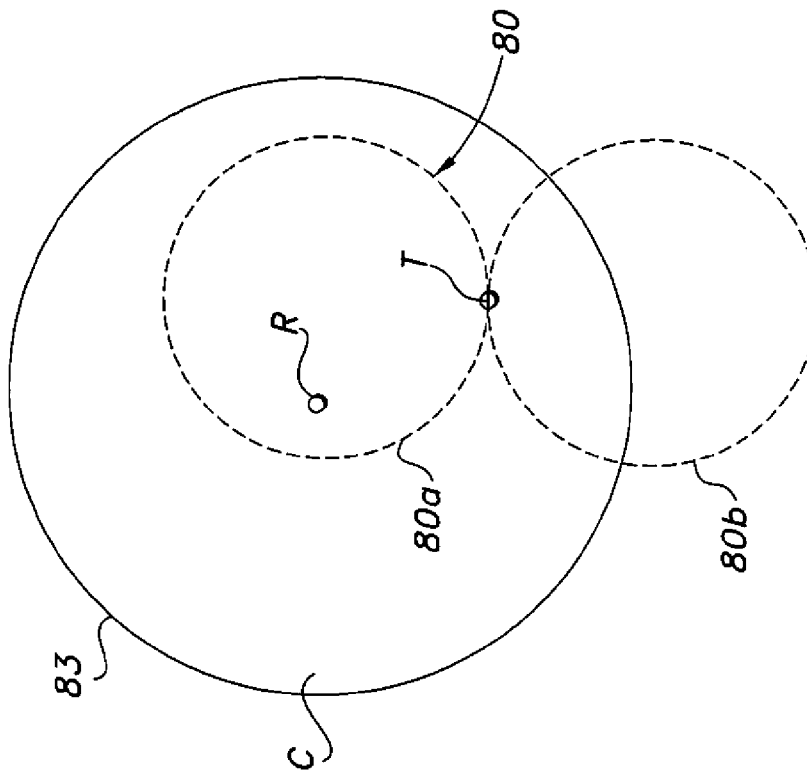
FIG. 10 is another simplified view of a portion of a network according to the invention.

The invention has thus far characterized the transmitting node as having a convex circular antenna pattern. Indeed, known mobile ad-hoc wireless networks typically use omni-directional antennas that can transmit and receive messages equally in any direction. This is particularly the case with airborne wireless networks, where three-dimensional aircraft maneuverability necessitates an isometric antenna pattern. However, many types of antenna radiation patterns exist, and even an isometric radiation pattern may be effectively changed by nearby terrain or other factors. The invention may therefore be implemented so that it can be used in a wide variety of environments and with a wide variety of non-isometric antenna radiation patterns. FIG. 10 depicts a transmitting node T having an antenna radiation pattern 80 resembling a 'FIG. 8.' Antenna radiation pattern 80 taken as a whole does not define a convex, circular coverage area as described previously herein. However, each lobe 80a, 80b of antenna radiation pattern 80 does define a convex, circular coverage area. The invention therefore analyzes each lobe 80a, 80b separately as if the lobes were unconnected to each other. The algorithms to complete this analysis are similar to Equations 3-6 and can be derived without undue experimentation. As seen in FIG. 10, the coverage area 80b intersects the perimeter 83 of the coverage area C of the receiving node R, and the extent of such coverage is added to the overall coverage angle as previously described.

Figure 12:
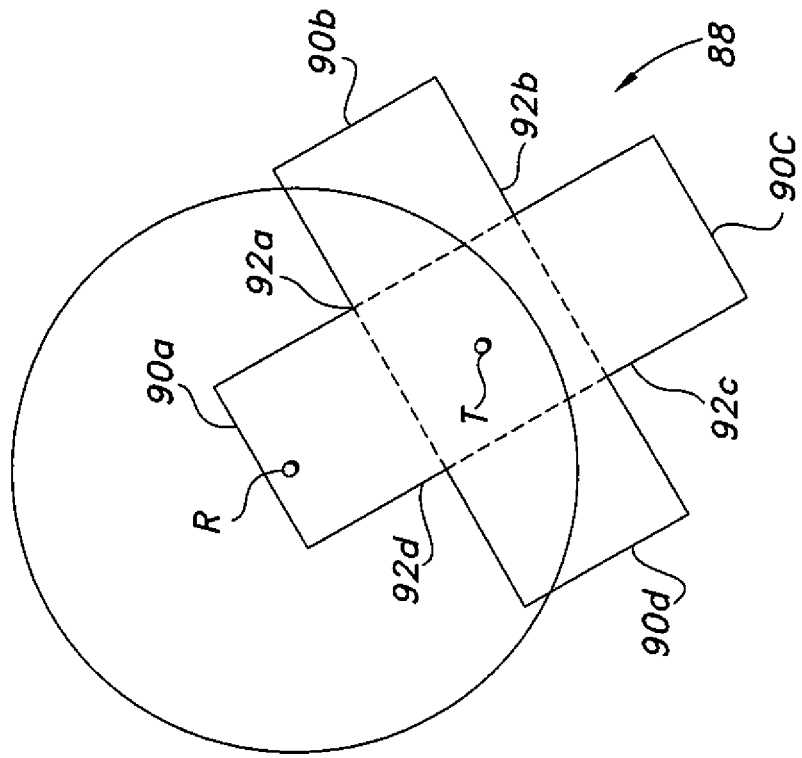
FIG. 12 is another simplified view of a portion of a network according to the invention.
Figure 11:
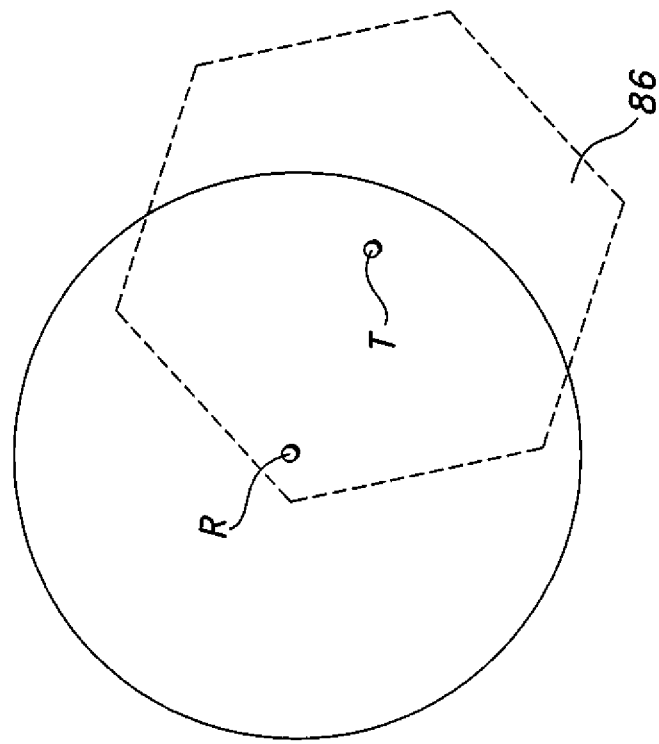
FIG. 11 is another simplified view of a portion of a network according to the invention.

FIG. 11 depicts a receiving node R and a transmitting node T, where the antenna radiation pattern of the transmitting node creates a convex but non-circular coverage area 86. As long as the shape of coverage area 86 is known, the intersection or overlap of coverage area 86 with the coverage area C of receiving node R can be determined. FIG. 12 shows a receiving node R and a transmitting node T, where the antenna radiation pattern of the transmitting node creates a coverage area 88 having convex regions 90a, 90b, 90c, 90d separated by concave regions 92a, 92b, 92c, 92d. As with the 'FIG. 8' radiation pattern 80 in FIG. 10, each convex region 90a-d is analyzed separately to determine any intersection with the perimeter 94 of coverage area C.

Figure 13:
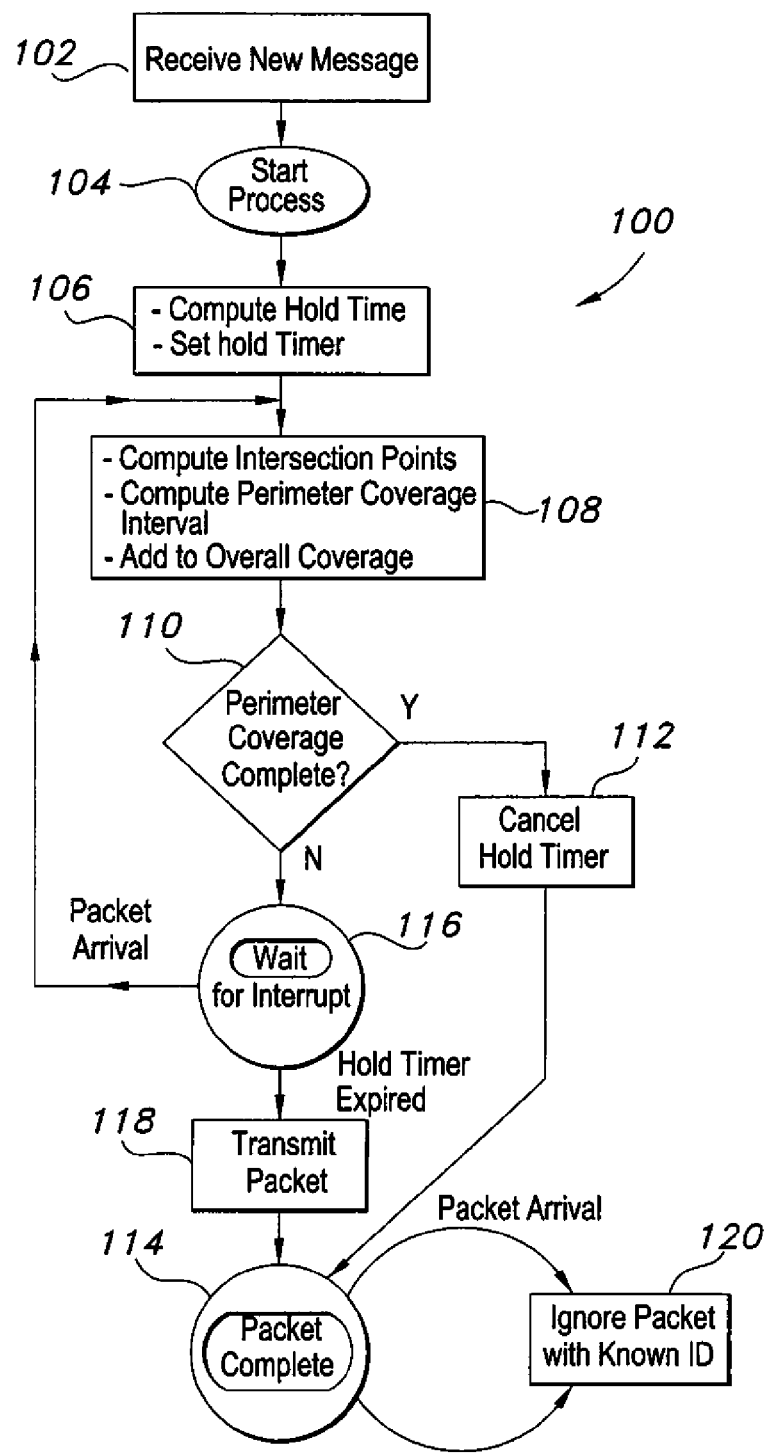
FIG. 13 is a depiction of a state machine according to a method of the invention.
Figure 15:
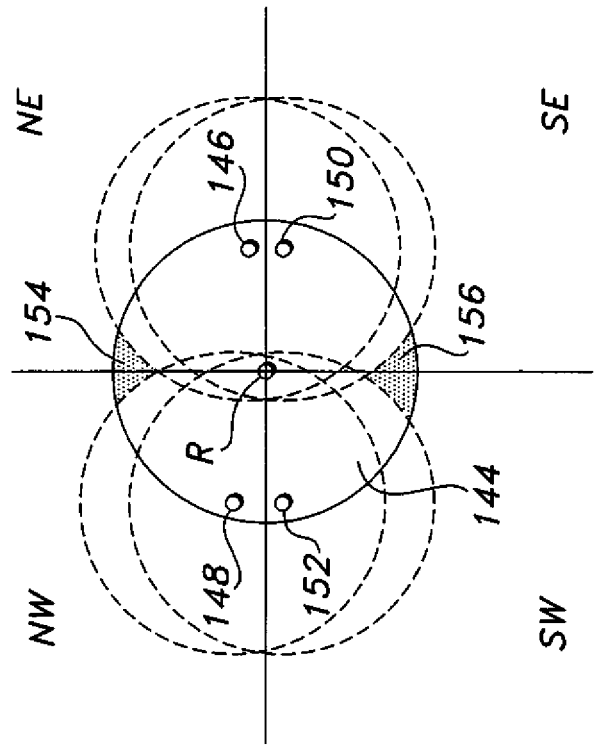
FIG. 15 is another simplified view of a network demonstrating the algorithm shown in FIG. 8.
Figure 14:
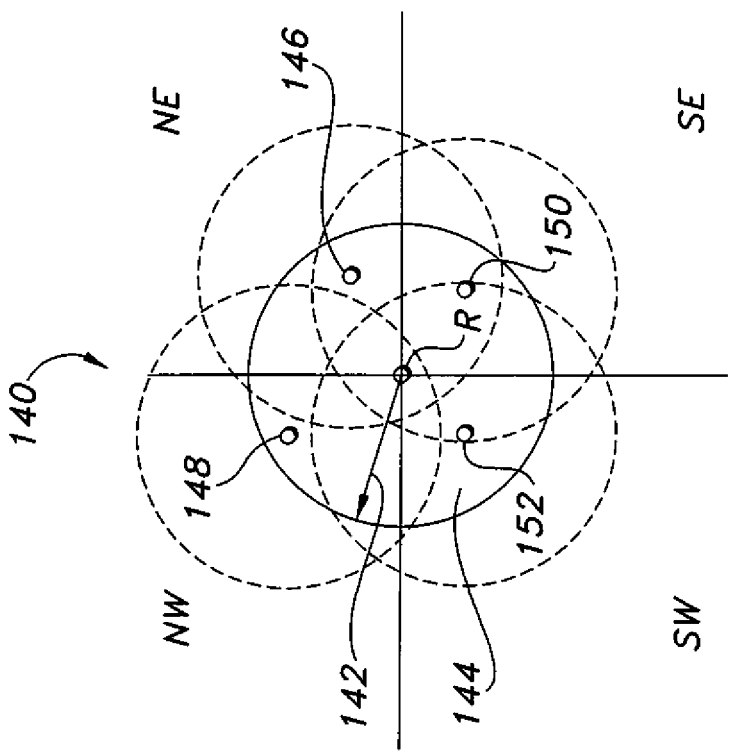
FIG. 14 is a simplified view of a network demonstrating a known algorithm for suppressing re-transmission of a message.
Figure 16:
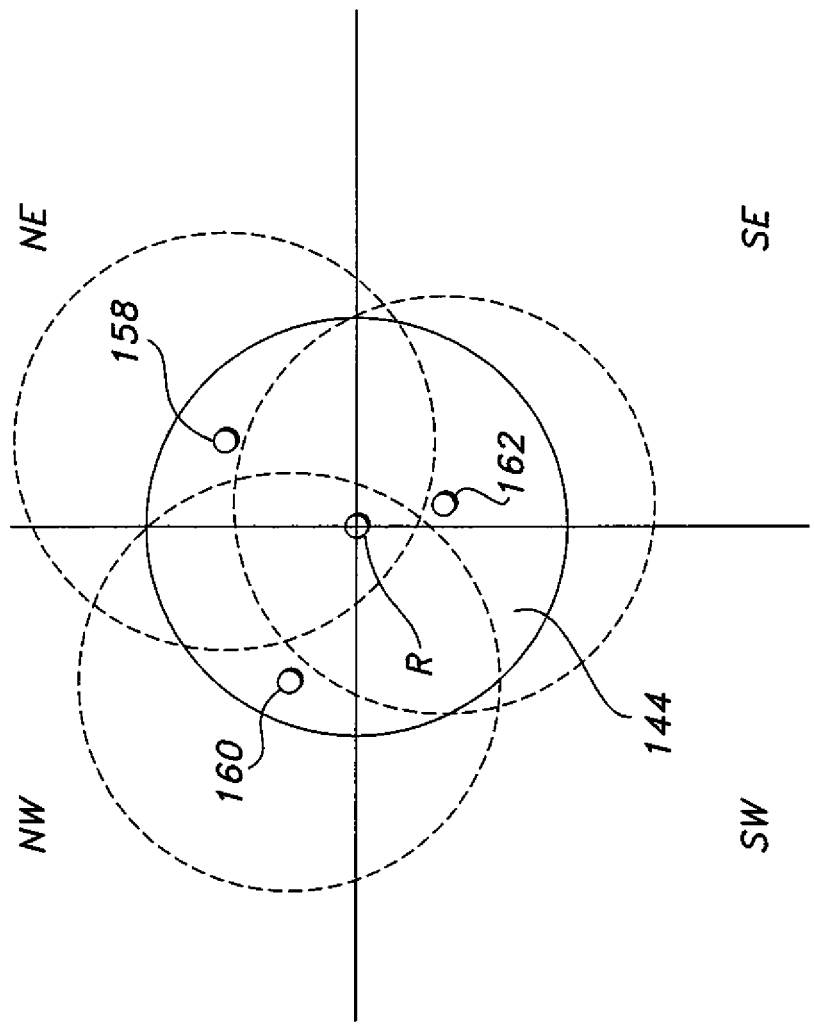
FIG. 16 is another simplified view of a network.

FIG. 13 is a state machine of a method 100 according to the invention. At 102 a receiving node receives a packet or message from a transmitting node. If the packet has an identifier, or ID, that does not match the ID of any previously received packet, at 104 the receiving node initializes the process. At 106 the receiving node computes a hold time using a formula or algorithm such as Equation 7. The receiving node also begins a hold timer based upon the computed hold time. At 108 the receiving node computes or otherwise determines the points where the perimeter of the coverage area of the transmitting node intersects the perimeter of the coverage area of the receiving node. Algorithms such as Equations 3 through 6 may be used for this purpose, although other formulas or algorithms may also be used. The receiving node calculates the respective angles, relative to the receiving node, of the points of intersection, said angles used to determine a linear interval of coverage of the receiving node's perimeter, where the linear interval represents the portion or portions of the receiving node's perimeter overlapped by received transmissions. The interval of coverage is added to any previously determined coverage from previous transmissions of the message. At 110 it is queried whether the perimeter of the receiving node is completely covered by received transmissions, i.e., whether the linear interval is complete between 0 and 6.28 radians or 0 and 360 degrees. If the perimeter of the receiving node is completely covered and the hold timer has not expired, at 112 the receiving node cancels the hold timer, and the state machine transfers to a wait state 114 without re-transmitting the packet. If at 110 it is determined that the perimeter of the receiving node is not completely covered, the state machine transfers to a wait state 116 to await the presence an interrupt. The state machine recognizes two interrupt conditions: first, the arrival of a packet with the same ID from another transmitting node; and second, the expiration of the hold timer. If at 116 a packet with the same ID arrives at the receiving node from another transmitting node, the state machine reverts to 108 to add the newly received packet to the overall perimeter coverage. If at 116 the hold timer expires before complete perimeter coverage is achieved, at 118 the receiving node re-transmits the packet, and the state machine transfers to wait state 114. At 120 the receiving node ignores any packet arriving at the receiving node that has the same ID as a packet that has arrived at wait state 114.

The invention may be varied in many ways while maintaining the spirit of the invention. For example, other formulas or methods may be used to compute (a) the endpoints of each coverage segment along the perimeter of the receiving node, (b) the angles or relative position of the endpoints, and/or (c) the extent of coverage along the receiving node's perimeter caused by multiple transmissions of a message.

The invention as described herein provides a method to efficiently transmit a message throughout a network, or a portion thereof, while minimizing the number of redundant transmissions. An advantage of the invention is that the re-transmission suppression of flooded messages depends on the relative location of the nodes within the network and a knowledge of the transmission range of the nodes. Since this information is typically transmittable in the header of each transmitted message, no additional network transmissions or instructions are required.

Still another advantage is that the algorithm or protocol as disclosed herein only requires the reception of as few as three transmissions to trigger suppressing re-transmission of the message. This is in comparison to the quadrant-based Geoflood protocol in which four transmissions are required to be received.

Yet another advantage is that the algorithm or protocol as disclosed herein ensures that, prior to suppressing re-transmission of a message, all portions of the coverage area of a receiving node have received the message from other nodes.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A device, comprising:
a receiver;
a transmitter having a transmission perimeter;
processing electronics coupled to the receiver and the transmitter, wherein the processing electronics are configured to recognize a message received from each of a plurality of transmitting nodes; and
wherein the processing electronics are configured to determine whether to retransmit the message by determining whether any portion of the transmission perimeter expands beyond a combined transmission area formed by the each of the plurality of the transmitting nodes, wherein perimeter arc segments are used to determine whether a portion of the transmission perimeter expands beyond the combined transmission area, wherein the processing electronics suppresses retransmission of the message by the transmitter when the transmission perimeter is completely within the combined transmission area within a predetermined time from when the receiver first receives the message and wherein the transmitters retransmits the message when the transmission perimeter is not determined to be completely within the combined transmission area within the predetermined time from when the transmitter first receives the message.

2. The device of claim 1, wherein the processing electronics are configured to wait a period of time after the message is first received before conducting the retransmission determination.

3. The device of claim 1, wherein the processing electronics are configured to determine which portion of the device's transmission perimeter is within the coverage area of each respective transmitting node.

4. The device of claim 1, wherein the processing electronics are configured to define, in a non-transitory memory and for the each of the plurality of the transmitting nodes, an arc segment representing the portion of the device's transmission perimeter covered by the transmitting node's coverage area.

5. The device of claim 1, wherein the processing electronics of the device ensure retransmission of the signal if when, by processing the transmission perimeter and the coverage areas, the device's transmission perimeter reaches a node outside of the transmission coverage area of the each the plurality of the transmitting nodes.

6. The device of claim 1, wherein the receiver is a radio frequency receiver and the transmitter is a radio frequency transmitter.

7. The device of claim 1, wherein a hold time for retransmitting is calculated as follows: $M_{hold} - M_{hold} \, d/R =$ the hold time, where $M_{hold}$ is the maximum holding time, d is the distance between the receiving node and a transmitting node associated with the message and R is the maximum transmission radius.

8. In a communications network having a plurality of nodes, a method of suppressing retransmission of a message by a receiving node, the method comprising:

the receiving node receiving the message from each of a plurality of transmitting nodes, each of the receiving node and the each of the plurality of the transmitting nodes having a coverage area bounded by a perimeter; and using electronics circuitry of the receiving node to suppress retransmission of the message by the receiving node in response to a determination that the perimeter of the coverage area of the receiving node is completely within a combined coverage area within a predetermined time from when the receiving node first received the message from one of the plurality of the transmitting nodes, wherein the combined coverage area is formed by the coverage areas of the each of the plurality of the transmitting nodes, wherein the perimeter of the coverage area is determined to be completely within the combined coverage area when the perimeter of the coverage area of the receiving node is determined to be completely covered by a set of combined arc segments derived from the transmissions from the each of the plurality of the transmitting nodes within a predeterminded time from when the receiving node first receives the message from the one of the plurality of the transmitting nodes;

wherein the receiving node retransmits the message when the perimeter of the coverage area of the receiving node is not determined to be completely within the combined coverage area within the predetermined time from when the receiving node first receives the message from the one of the plurality of the transmitting nodes, wherein perimeter arc segments are used to determine whether a portion of the transmission perimeter expands beyond the combined transmission area.

9. The method of claim 8, further comprising:

for the each of the plurality of the transmitting nodes, determining which portion of the perimeter of the coverage area of the receiving node is within the coverage area of the respective transmitting node.

10. The method of claim 8, further comprising:

for each transmission of the message received by the receiving node from the each of the plurality of the transmitting nodes, defining an arc segment along the perimeter of the coverage area of the receiving node, the arc segment representative of the extent to which the perimeter of the coverage area of the respective transmitting node intersects the perimeter of the coverage area of the receiving node.

11. The method of claim 8, wherein suppressing re-transmission of the message is performed when the perimeter of the coverage area of the receiving node is completely covered by the arc segments derived from the transmissions from the each of the plurality of the transmitting nodes.

12. The method of claim 8, further comprising:

for the each of the plurality of the transmitting nodes, the receiving node determining a position of the respective transmitting node relative to the receiving node, wherein the determining of which portion of the perimeter of the coverage area of the receiving node is within the coverage area of the respective transmitting node is based upon the position of the respective transmitting node relative to the receiving node.

13. The method of claim 8, wherein the message transmitted by the each of the plurality of the transmitting node communicates a position of the respective transmitting node.

14. The method of claim 8, wherein number of transmitting nodes is at least three.

15. The method of claim 8, further comprising:

separating the coverage area of the one of the plurality of the transmitting nodes into convex regions when the coverage area of the one of the plurality of the transmitting nodes includes a concave region; and for each convex region, determining which portion of the perimeter of the coverage area of the receiving node is within the coverage area of the respective convex region.

16. A communications unit configured for use in an ad-hoc wireless network, comprising:

a first transceiver configured to receive a message from other transceivers in a coverage area, an outer limit of the coverage area defined by a perimeter; and a processor configured to determine a relative position of the other transceivers from which the message has been received, the processor further configured to suppress retransmission of the message by the first transceiver when the perimeter of the coverage area associated with the first transceiver is completely within a combination of coverage areas of the other transceivers from which the message has been received, wherein combined arc segments derived from transmissions from the other transceivers are used to determine whether a portion of the transmission perimeter expands beyond the combined transmission area, wherein the processor suppresses retransmission of the message by the first transceiver when the perimeter of the coverage area of the first transceiver is determined to be completely covered by the combined arc segments derived from the transmissions from the other transceivers within a predeterminded time from when the first transceiver first receives the message from one of the other transceivers.

17. The communications unit of claim 16, wherein the processor further comprises a timer function, and wherein the processor suppresses retransmission of the message by the first transceiver when the perimeter of the coverage area of the first transceiver is completely within the combination of coverage areas of the other transceivers within a predetermined time from when the first transceiver first receives the message.

18. The communications unit of claim 16, wherein the first transceiver retransmits the message when the perimeter of the coverage area of the first transceiver is not determined to be completely within the combination of coverage areas of the other transceivers within a predetermined time from when the first transceiver first receives the message.

19. The communications unit of claim 16, further comprising a position indicator operationally coupled to the processor, wherein the position indicator provides a current position of the communications unit for insertion into the message when it is determined to re-transmit the message.

20. The communications unit of claim 16, wherein number of other transceivers is at least three.

21. In a communications network having a plurality of nodes, a method of suppressing re-transmission of a message by a receiving node, the method comprising:

the receiving node receiving the message from each of a plurality of transmitting nodes, each of the receiving node and the each of the plurality of the transmitting nodes having a coverage area bounded by a perimeter;

for the each of the plurality of the transmitting nodes, determining which portion of the perimeter of the coverage area of the receiving node is within the coverage area of the respective transmitting node;

suppressing re-transmission of the message by the receiving node when the perimeter of the coverage area of the receiving node is determined to be completely covered by a set of combined arc segments derived from the transmissions from the each of the plurality of the transmitting nodes within a predeterminded time from when the receiving node first receives the message from one of the plurality of transmitting nodes; and the receiving node retransmitting the message when the perimeter of the coverage area of the receiving node is not determined to be completely covered by the set of combined arc segments derived from the transmissions from the each of the plurality of the transmitting nodes within the predetermined time from when the receiving node first receives the message.

22. The method of claim 21, further comprising:
for each transmission of the message received by the receiving node from the each of the plurality of the transmitting nodes, defining an arc segment along the perimeter of the coverage area of the receiving node, the arc segment representative of the extent to which the perimeter of the coverage area of the respective transmitting node intersects the perimeter of the coverage area of the receiving node.

23. The method of claim 22, wherein the suppressing re-transmission of the message is performed when the perimeter of the coverage area of the receiving node is completely covered by the arc segments derived from the transmissions from the each of the plurality of the transmitting nodes.

24. The method of claim 23 further comprising:
for the each of the plurality of the transmitting nodes, the receiving node determining a position of the respective transmitting node relative to the receiving node, wherein the determining of which portion of the perimeter of the coverage area of the receiving node is within the coverage area of the respective transmitting node is based upon the position of the respective transmitting node relative to the receiving node.

25. The method of claim 21, wherein the message transmitted by the each of the plurality of the transmitting node communicates the position of the respective transmitting node.

26. The method of claim 21, further comprising:
separating the coverage area of the one of the plurality of the transmitting nodes into convex regions when the coverage area of the one of the plurality of the transmitting nodes includes a concave region; and
for each convex region, determining which portion of the perimeter of the coverage area of the receiving node is within the coverage area of the respective convex region.

27. In a communications network having a plurality of nodes, a method of suppressing re-transmission of a message by a receiving node, the method comprising:
the receiving node receiving the message from each of a plurality of transmitting nodes, each of the receiving node and the each of the plurality of the transmitting nodes having a coverage area bounded by a perimeter, wherein the coverage areas of the receiving node and the each of the plurality of the transmitting nodes are substantially similar in size;
for each transmission of the message received by the receiving node from the each of the plurality of the transmitting nodes, defining an arc segment along the perimeter of the coverage area of the receiving node, the arc segment representative of the extent to which the perimeter of the coverage area of the respective transmitting node intersects the perimeter of the coverage area of the receiving node;

suppressing retransmission of the message by the receiving node when the perimeter of the coverage area of the receiving node is determined to be completely covered by a set of combined arc segments derived from the transmissions from the each of the plurality of the transmitting nodes within a predetermined time from when the receiving node first receives the message from one of the plurality of the transmitting nodes when the perimeter of the coverage area of the receiving node is determined to be completely covered by a set of combined arc segments derived from the transmissions from the each of the plurality of the transmitting nodes within the predetermined time from when the receiving node first receives the message; and the receiving node retransmitting the message when the perimeter of the coverage area of the receiving node is not determined to be completely covered by the set of combined arc segments derived from the transmissions form the each of the plurality of the transmitting nodes within the predetermined time from when the receiving node first receives the message when the perimeter of the coverage area of the receiving node is not determined to be completely covered by the set of combined arc segments derived from the transmissions from the each of the plurality of the transmitting nodes within the predeterminded time from when the receiving node first receives the message from the one of the plurality of the transmitting nodes.

28. A communications unit configured for use in and ad-hoc wireless network, comprising:
a first transceiver configured to receive a message from other transceivers in a coverage area, an outer limit of the coverage area defined by a perimeter; and
a processor configured to determine a relative position of the other transceivers from which the message has been received; and
wherein the processor further comprises a timer function, and wherein the processor suppresses retransmission of the message by the first transceiver when the perimeter of the coverage area of the first transceiver is completely within a combination of coverage areas of the other transceivers within a predetermined time from when the first transceiver first receives the message, wherein the first transceiver retransmits the message, when the perimeter of the coverage area of the first transceiver is not determined to be within the combination of the coverage areas of the other transceivers within the predetermined time from when the first transceiver receives the message.

29. The communications unit of claim 28, further comprising a position indicator operationally coupled to the processor, wherein the position indicator provides a current position of the communications unit for insertion into the message when it is determined to retransmit the message.

* * * * *